(12) United States Patent
Swarup et al.

(10) Patent No.: US 8,846,156 B2
(45) Date of Patent: Sep. 30, 2014

(54) METHODS AND COMPOSITIONS FOR COATING SUBSTRATES

(71) Applicant: PPG Industries Ohio, Inc., Cleveland, OH (US)

(72) Inventors: Shanti Swarup, Allison Park, PA (US); Xiangling Xu, Pittsburgh, PA (US); Richard J. Sadvary, Allison Park, PA (US); Anthony M. Chasser, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/780,540

(22) Filed: Feb. 28, 2013

(65) Prior Publication Data

US 2014/0242280 A1 Aug. 28, 2014

(51) Int. Cl.
| | |
|---|---|
| *B05D 3/02* | (2006.01) |
| *C09D 175/06* | (2006.01) |
| *B05D 7/00* | (2006.01) |

(52) U.S. Cl.
CPC .............. *C09D 175/06* (2013.01); *B05D 3/02* (2013.01); *B05D 7/52* (2013.01); *B05D 3/0209* (2013.01); *B05D 7/53* (2013.01); *B05D 7/532* (2013.01); *B05D 7/536* (2013.01); *B05D 7/534* (2013.01); *B05D 7/57* (2013.01); *B05D 7/56* (2013.01); *B05D 7/576* (2013.01); *B05D 7/574* (2013.01); *B05D 7/572* (2013.01); *B05D 7/577* (2013.01)
USPC ...................................................... 427/407.1

(58) Field of Classification Search
None
See application file for complete search history.

(56) References Cited

U.S. PATENT DOCUMENTS

| | | | |
|---|---|---|---|
| 5,348,997 | A | 9/1994 | Kato et al. |
| 5,472,996 | A | 12/1995 | Hayashi et al. |
| 5,571,861 | A | 11/1996 | Klein et al. |
| 5,614,582 | A | 3/1997 | Hori et al. |
| 5,623,016 | A | 4/1997 | Klein et al. |
| 5,912,293 | A | 6/1999 | Stockwell et al. |
| 7,531,074 | B2 | 5/2009 | Purdy et al. |
| 2001/0024693 | A1* | 9/2001 | Morimoto et al. ............ 427/404 |
| 2004/0159555 | A1 | 8/2004 | Purdy et al. |
| 2009/0117396 | A1* | 5/2009 | Furusawa et al. ............ 428/458 |
| 2011/0117378 | A1* | 5/2011 | Kawaguchi et al. .......... 428/480 |
| 2011/0151128 | A1* | 6/2011 | Boggs et al. ................ 427/389.9 |
| 2011/0177352 | A1 | 7/2011 | Ambrose et al. |
| 2011/0300389 | A1* | 12/2011 | Kitagawa et al. .......... 428/423.1 |
| 2012/0021228 | A1* | 1/2012 | Kitagawa et al. .......... 428/423.1 |

FOREIGN PATENT DOCUMENTS

| | | |
|---|---|---|
| JP | 1995082456 A | 3/1995 |
| JP | 10-139839 | 5/1998 |
| WO | WO 97/47401 | 12/1997 |
| WO | WO 2011/127641 A1 | 10/2011 |
| WO | WO2013/181068 A2 | 12/2013 |

* cited by examiner

*Primary Examiner* — Erma Cameron
(74) *Attorney, Agent, or Firm* — Krisanne Shideler

(57) ABSTRACT

A method for applying a multilayer coating comprising a basecoat and a clearcoat is disclosed. The basecoat is a curable aqueous composition comprising (1) polymeric particles prepared from ethylenically unsaturated compounds including a multi-ethylenically unsaturated monomer and a keto or aldo-functional monomer, and (2) a polyhydrazide.

19 Claims, 1 Drawing Sheet

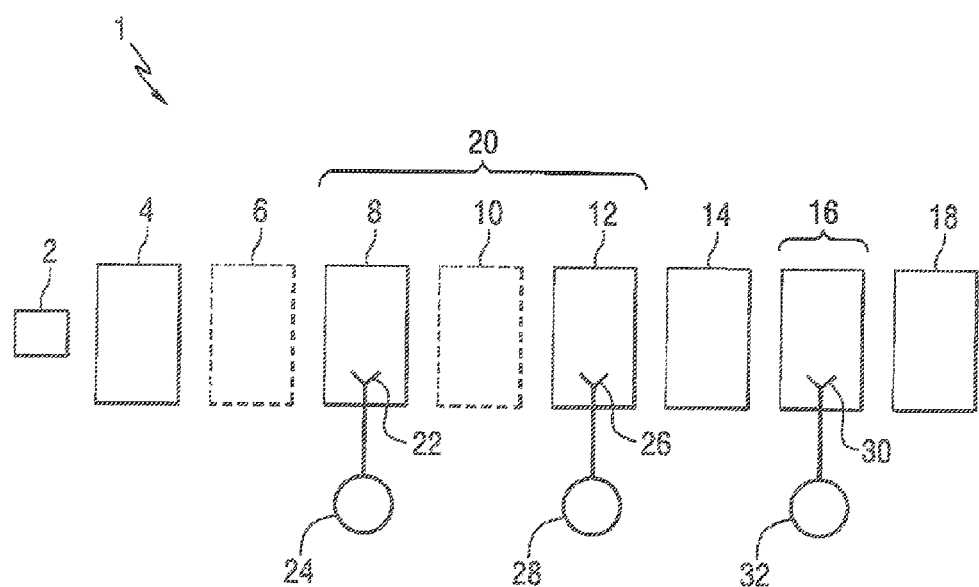

METHODS AND COMPOSITIONS FOR COATING SUBSTRATES

FIELD OF THE INVENTION

The present invention relates to methods for coating automotive substrates and to the coating compositions used in the methods. More particularly, the invention relates to (1) coating automotive substrates with a reduced number of steps while producing coatings meeting the commercial standards for appearance and for physical and chemical properties and (2) the coating compositions that make this possible.

BACKGROUND OF THE INVENTION

Commercial automotive coatings, that is, coatings for passenger cars and trucks, require many application and processing steps. Typically, a primer coat to provide corrosion resistance is applied by electrodeposition to the automotive body and then cured by heating in an oven. The automotive body is then passed to a coating station where a primer surfacer is applied to provide a thick heavy pigmented coating that provides protection against road stone damage and also shields the electrodeposited primer layer from ultraviolet light that can deteriorate the primer layer. The primer surfacer layer is separately heat cured. Next a color-imparting basecoat is applied to the cured primer surfacer layer. The basecoat layer is typically derived from a water-based composition comprising a polymer, typically a (meth)acrylic polyol and a melamine curing agent. The basecoat layer is typically dehydrated at about 80-85° C. but not cured. An unpigmented transparent coat, called a clearcoat, is applied to the dehydrated basecoat. The clearcoat is a curable composition and the composite color plus clear coating cured in one step at about 140-150° C. This is the case even if the clearcoat is curable at lower temperatures such as with clearcoats that are based on hydroxyl-isocyanate curing because the basecoat composition with the melamine curing agent requires higher temperatures for curing.

There have been attempts to reduce the coating and curing steps required in an automotive coating line. Accordingly, formation of the basecoats have improved such that they provide stone chip resistance and ultraviolet protective properties allowing the elimination of the primer surfacer layer while still providing the color aesthetics necessary for an automotive color-imparting topcoat.

However, a problem exists in that the basecoat layer is only dehydrated but not cured before application of the clearcoat. The uncured or partially cured basecoat does not have sufficient "hold out" properties, that is, solvents from the clearcoat can migrate into the basecoat adversely affecting pigment orientation in the basecoat. Also, lack of cure can adversely affect intercoat adhesion. The basecoat could be cured before application of the clearcoat but this would add another energy-consuming step in the coating process.

The present invention provides a solution to these problems by providing a basecoat composition that cures through the dehydration step resulting in a high degree of cure before the clearcoat is applied. Since the basecoat has a high degree of cure, this allows the clearcoat to be cured at a lower temperature.

SUMMARY OF THE INVENTION

The present invention provides a method of applying a multilayer coating to a substrate comprising:

(a) applying, without application of an intermediate primer surfacer coating, a color-imparting, pigment-containing basecoat composition directly to a cured electrodeposited primer coating that is adhered to the substrate to form a curable color-imparting basecoat layer, and (b) applying a curable unpigmented coating composition to the basecoat layer to form a transparent coating layer over the basecoat layer, wherein the basecoat layer is formed by depositing a polyhydrazide-containing curable aqueous composition comprising:
  (i) a continuous phase comprising water, and
  (ii) a dispersed phase comprising:
    (A) polymeric particles prepared from the polymerization of a mixture of ethylenically unsaturated monomer compounds, including ethylenically unsaturated monomers comprising:
      (1) a multi-ethylenically unsaturated monomer and
      (2) a keto or an aldo group-containing ethylenically unsaturated monomer.

The invention also provides an aqueous polyhydrazide-containing thermosetting coating composition comprising:
(a) a continuous phase comprising water, and
(b) a dispersed phase comprising:
  (i) pigments;
  (ii) polymeric particles prepared from the polymerization of a mixture of ethylenically unsaturated compounds including ethylenically unsaturated monomers comprising from:
    (A) 2 to 30 percent by weight of a multi-ethylenically unsaturated monomer and
    (B) at least 30 percent by weight of a keto group-containing ethylenically unsaturated monomer,
    the percentages by weight being based on total weight of the ethylenically unsaturated monomers.

BRIEF DESCRIPTION OF THE DRAWING

FIG. 1 is a schematic block diagram of a coating line in an automotive assembly plant illustrating features of the method of the invention.

DETAILED DESCRIPTION

As used herein, any numerical range recited is intended to include all sub-ranges subsumed therein. For example, a range of 1" to 10" is intended to include all sub-ranges between value of 1 and the recited maximum value of 10, that is, having a minimum value equal to or greater than 1 and a maximum value of equal to or less than 10.

Also, as used herein, the term "polymer" is meant to refer to oligomers and both homopolymers and copolymers. Unless stated otherwise, as used in the specification and the claims, molecular weights are either number average molecular weights as indicated by "Mn" or weight average molecular weights as indicated by "Mw", both of which obtained by gel permeation chromatography using polystyrene standards in an art-recognized manner. The term (meth)acrylates refers to both acrylates and methacrylates.

FIG. 1 schematically depicts a coating line 1 used in an automotive assembly plant.

Useful substrates 2 that can be coated according to the method of the present invention include metallic substrates that can be used to fabricate automotive vehicles, such as automobiles, trucks and tractors. The substrates can have any shape, but in one embodiment are in the form of automotive body components such as bodies (frames), hoods, doors, fenders, bumpers and/or trim for automotive vehicles.

With reference to FIG. 1, a metal substrate 2 is passed to an electrodeposition station 4 where a coating compositions is electrodeposited over the metal substrate 2. Suitable electrodeposition coatings are ED 6280 and ED 7000 commercially available from PPG Industries. Useful electrodeposition methods and electrodeposition coating compositions include conventional anionic or cationic electrodepositable coating compositions, such as epoxy or polyurethane-based coatings. Suitable electrodepositable coatings are disclosed in U.S. Pat. Nos. 4,933,056; 5,530,043; 5,760,107 and 5,820,987. The electrodeposition coating layer is cured in an oven 6, before further processing. Curing conditions are typically from 175 to 205° C. for 20 to 60 minutes.

Unlike many conventional coating lines, the coating line of the invention does not include a primer-surfacer zone for application, curing, and/or sanding of a primer-surfacer. By eliminating the need for a primer-surfacer, the coating equipment required for primer-surfacer application, e.g., coating booths, coating applicators, drying ovens, sanding equipment, and tacking equipment, can also be eliminated. Additionally, the elimination of the primer-surfacer also speeds up the overall coating process and reduces the floor space and energy requirements needed to coat the substrate 2.

A basecoat layer is directly applied to the electrodeposited coating layer in a basecoat zone 20 comprising one or more coating stations. The basecoat zone 20 is located downstream of and adjacent to the electrodeposition oven 6. The first basecoat station 8 has one or more conventional applicators 22, e.g., bell or gun applicators, connected to or in flow communication with a source 24 of a first basecoat composition. The first basecoat composition can be applied, e.g., sprayed, over the substrate 2 by one or more applicators 22 at the first basecoat station 8 in one or more spray passes to form a first basecoat layer over the substrate 12. As will be described in more detail below, the first basecoat composition is an aqueous composition comprising a resinous binder that cures during dehydration of the basecoat layer and a color-imparting pigment composition comprising one or more coloring pigments. Typically when more than one basecoat layer is applied to the substrate, the first basecoat composition will not contain a color effect pigment such as aluminum flake or metal oxide coated micas. These color effect pigments will be applied in a second basecoat layer. However, where only one basecoat layer is applied to the substrate, the color effect pigments can be contained in the basecoat composition.

An optional drying device, such as an oven 10 or flash chamber, can be located downstream of and/or adjacent to the first basecoat station 8 to optionally dehydrate and cure the first basecoat layer. In one embodiment, there is no dehydration of the applied first basecoat composition before application of the second basecoat composition described below. However, when only one basecoat layer is applied to the substrate, the basecoat layer is dehydrated before application of the clearcoat. Typically, dehydration of the first basecoat layer will be at a temperature of ambient to 90° C., usually 50-80° C.

A second basecoat station 12 can be located downstream of and/or adjacent to the first basecoat station 8 and can have one or more conventional applicators 26, e.g., bell or gun applicators, connected to and in flow communication with a source 28 of a second basecoat composition described in more detail below. The second basecoat composition can be applied, e.g., sprayed, over the first basecoat composition by one or more applicators 26 in one or more spray passes to form a second basecoat layer over the first basecoat layer. In one embodiment, the second basecoat composition is applied "wet-on-wet" onto the first basecoat layer, i.e., there is no dehydration of the applied first basecoat composition before application of the second basecoat composition. Thus, a multilayer composite basecoat can be formed by the second basecoat layer applied over the first basecoat layer. As described in more detail below, the second basecoat composition is an aqueous composition comprising a resinous binder that cures during dehydration of the basecoat layer and can be the same or different than the resinous binder present in the first basecoat composition. The second basecoat composition also includes a second pigment composition that can be the same as or different than the first pigment composition.

A conventional drying device, such as an oven 14, is located downstream of and/or adjacent to the second coating station 12 and/or the first basecoat station 8 where the basecoats can be dried and cured. The second basecoat layer can be dehydrated and cured separately when the first basecoat layer has been previously dehydrated and cured. Typically, dehydration of the second basecoat layer will be at a temperature of ambient to 90° C., usually 50-80° C. Alternatively, when the second basecoat layer is applied wet-on-wet to the first basecoat layer, both basecoat layers can be simultaneously dehydrated and cured at a temperature of ambient to 90° C., usually 50-80° C.

After the basecoat layer(s) have been dehydrated and cured, one or more conventional clearcoat layers can be applied over the basecoat layer(s) at a clearcoat station 16. The clearcoat station includes one or more conventional applicators 30 (e.g., bell applicators) connected to and in flow communication with a source 32 of clearcoat composition. The clearcoat composition is unpigmented and contains resinous ingredients that are dissolved in a diluent that may be an organic solvent or may be a mixture of organic solvents and water. In the embodiment shown in FIG. 1, an oven 18 is located downstream of and/or adjacent to the clearcoat station 16 to cure the clear or transparent layer. Depending on the resinous ingredients in the clearcoat composition, curing typically occurs at a temperature of 80-150° C. for a period of 20 to 40 minutes. The clearcoat compositions are known in the art for automotive applications. Such compositions are described in U.S. Pat. Nos. 4,650,718; 5,814,410; 5,891,981 and WO 98/14379. Automotive clearcoat compositions are commercially available from PPG Industries under the trademarks NCT, DIAMOND COAT and CERAMICLEAR.

As used herein, "cure" means that resinous components of the coating layers are substantially crosslinked as evidenced by the attainment of physical and chemical properties necessary for automotive quality coatings. Cure or the degree of cure can be determined by dynamic mechanical thermal analysis (DMTA) using a Polymer Laboratories MK III DMTA analyzer conducted under nitrogen. Accordingly, cure means a degree of cure be at least 50, such as at least 85, and at least 90 percent of complete crosslinking as determined by the analysis mentioned above.

The curable aqueous compositions that are useful in the method of the invention comprise a dispersion of polymeric particles in a continuous aqueous phase. The polymeric particles are prepared from the polymerization of a mixture of ethylenically unsaturated compounds including ethylenically unsaturated monomers that comprise at least one multi-ethylenically unsaturated monomer and at least one keto or aldo group containing ethylenically unsaturated monomer.

The dispersion of polymeric particle can be made by conventional oil in water emulsion polymerization techniques typically to a solids content of 20 to 50 percent by weight. The polymerization can be conducted using conventional additives such as emulsifiers, protective colloids, free radical initiators and chain transfer agents. Generally, the polyhydrazide is added after the polymerization. The polymeric particles have a mean particle size (diameter) of from 40 to 250 nanometers.

The multi-ethylenically unsaturated monomers are typically diethylenically or triethylenically unsaturated monomers. Suitable monomers include divinyl aromatics such as divinyl benzene, diacrylates and dimethacrylates of $C_{2-24}$ diols such as butane diol and hexane diol, divinyl ethylene urea and other divinyl ureas, and diallyl and triallyl compounds such as diallyl phthalate and triallyl isocyanurate. The amount of multi-ethylenically unsaturated monomers is 2 to 30 percent by weight based on total weight of ethylenically unsaturated monomer. The inclusion of such monomers causes crosslinking between the polymer backbones, which is important because such crosslinking allows the basecoat to hold out the subsequently applied clearcoat from stretching in to the basecoat adversely affecting appearance and physical properties. Amounts less than 2 percent by weight provide insufficient crosslinking, whereas amounts greater than 30 percent are also undesirable because the composition becomes very viscous and difficult to process.

The aldo or keto group containing ethylenically unsaturated monomer is reactive with the polyhydrazide upon dehydration of the basecoat(s) resulting in a cured or crosslinked coating. Examples of such monomers include (meth)acrolein, diacetone(meth)acrylamide, acetoacetoxyethyl(meth)acrylate and vinyl acetoacetate. The aldo or keto group containing ethylenically unsaturated monomer is typically present in an amount of at least 30 percent by weight based on total weight of ethylenically unsaturated monomers. Amounts less than 30 percent are undesirable because of poor physical properties such as solvent resistance and humidity resistance. Typically, amounts greater than 60 percent by weight are not used because of the need to incorporate other ethylenically unsaturated monomers as described below to obtain the physical and chemical properties required for automotive quality coatings.

Besides the ethylenically unsaturated monomers mentioned above, alkyl esters of (meth)acrylic acid are usually used in the preparation of the polymeric particles. Typically, these monomers contain from at least 4, such as 4 to 10 carbon atoms, and at least 6, such as 6 to 10 carbon atoms in the alkyl group. These monomers are typically present in amounts of 4 to 40 percent by weight based on total weight of ethylenically unsaturated monomers. These monomers provide for low glass transition temperatures ($T_g$) in the cured basecoat layers, which is desirable because of road stone and chip resistance. $T_g$s less than 25° C. are desirable.

The $T_g$ can be measured on a cured film of the polymeric particles by Differential Scanning Colorimetry (rate of heating of 10° C./minute with the $T_g$ taken at the first inflection point). Examples of suitable monomers include isooctyl acrylate, 4-methyl-2-pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and the like, including mixtures thereof.

Other ethylenically unsaturated monomers may also be used such as hydroxyalkyl esters of (meth)acrylic acid such as hydroxyethyl and hydroxypropyl(meth)acrylate; alkyl esters of (meth)acrylic acid having 1 to 2 carbon atoms in the alkyl group such as methyl(meth)acrylate; acid group containing monomers such as (meth)acrylic acid; and vinyl aromatic monomers such as styrene and vinyl toluene. Amounts of 0 to 60 percent are typical.

Besides the ethylenically unsaturated monomers, other ethylenically unsaturated compounds may be used. An example of such a compound is an ethylenically unsaturated polyurethane. These materials can be prepared by reaction of a polyisocyanate, usually a diisocyanate with a polyol, a polyol such as a diol containing carboxylic acid groups, optionally another polyol having a number average molecular weight of 60 to 10,000 and a hydroxyl group-containing ethylenically unsaturated monomer.

Among the polyisocyanates that may be used are aliphatic including cycloaliphatic diisocyanates such as tetramethylene diisocyanate, 2,2,4-trimethylhexane diisocyanate, hexamethylene diisocyanate, lysine diisocyanate, as well as alicyclic diisocyanates such as 1,4-cyclohexylene diisocyanate, 4,4'-dicyclohexylmethane diisocyanate, isophorone diisocyanate and the like.

As polyols, there may be used low molecular weight glycols, high molecular weight glycols, such as polyether polyols, and the like individually, or mixtures of high molecular weight glycols and low molecular weight glycols.

Examples of low molecular weight glycols are ethylene glycol, diethylene glycol, triethylene glycol, 1,2-propylene glycol, 1,3-butylene glycol, tetramethylene glycol, hexamethylene glycol, and the like, which may be used individually or in admixture.

Examples of high molecular weight polyglycols, are polyether glycols such as polyethylene glycol, polypropylene glycol, polytetramethylene glycol, and the like, and polyester glycols.

Examples of carboxylic acid group-containing polyols, are 2,2-dimethylol propionic acid, 2,2-dimethylol butyric acid, 2,2-dimethylol valeric acid, and the like. Typically, the carboxylic acid group-containing polyols are present in amounts of 5 to 30 percent by weight based on weight of resin solids of the ethylenically unsaturated polyurethane. The acid value of the ethylenically unsaturated polyurethane is typically about 20 to 60 based on resin solids of the ethylenically unsaturated polyurethane.

Examples of hydroxyl group-containing ethylenically unsaturated monomers are (meth)acrylates such as 2-hydroxyethyl(meth)acrylate, hydroxypropyl(meth)acrylate, hydroxybutyl(meth)acrylate, and the like.

Also, allyl compounds such as allyl alcohol may be used.

The synthesis reaction of the ethylenically unsaturated polyurethane resin may be carried out with one or more of the acrylic monomers such as 2-ethylhexyl(meth)acrylate acting as a reactive solvent. Also, an unreactive organic solvent that is inactive to the isocyanate group and which has high compatibility with water, such as dioxane, acetone, methyl ethyl ketone, methyl isobutyl ketone, N-methylpyrrolidone, tetrahydrofuran and the like may be used.

The proportions of the hydroxyl group-containing reactants may be changed variously but the equivalent ratio between isocyanate groups and hydroxyl groups in all components is from 1:1 to 1:1.5 such as 1:1 to 1:1.3. The amount of the hydroxyl group-containing ethylenically unsaturated monomer may be 0.01-1, usually 0.02-0.8 equivalent to 1 equivalent of isocyanate group.

Preparation of the ethylenically unsaturated polyurethane resin is not limited to any one method, and diisocyanate, a polyol, a carboxyl group-containing diol and a hydroxyl group-containing ethylenic unsaturated monomer may be reacted simultaneously, or the resin may be prepared by multi-step reaction method. In the latter case, a diisocyanate is reacted with a part of the polyol and a carboxyl group-containing diol to synthesize a prepolymer having the isocyanate end, and thereafter the remainder of the polyol and a hydroxyl group-containing ethylenic unsaturated monomer are reacted with the prepolymer. Generally, the reaction may be carried out at the temperature of 40-180° C., usually 60-130° C.

In order to accelerate the reaction, there may be used catalysts generally used in the conventional urethane reactions, such as triethylamine, N-ethyl morpholine, triethyldiamine and the like, as well as tin type catalysts such as dibutyl tin dilaurate, dioctyl tin dilaurate and the like. Furthermore, in order to prevent polymerization of an ethylenic unsaturated compound during the urethane reaction, there may be used hydroquinone, hydroquinone monomethyl ether, p-benzoquinone and the like.

For enhanced dispersion stability, the polymeric particles can contain an amine salt group. Typically, this can be incorporated into the particle by forming the amine salt of the acid associated with the ethylenically unsaturated polyurethane. The acid groups can be at least partially neutralized, i.e., at least 30 percent of the total neutralization equivalent, by an inorganic base such as sodium hydroxide or an amine, particularly a volatile amine. Examples of suitable amines are ammonia, dimethylamine, trimethylamine, monoethanolamine, and dimethylethanolamine. By carboxylic acid functionality is meant carboxylic acid as well as salts thereof.

The ethylenically unsaturated polyurethanes typically comprise from 30 to 60 percent by weight of the ethylenically unsaturated compounds used in the preparation of the polymeric particles and ethylenically unsaturated monomers comprise from 40 to 70 percent by weight of the ethylenically unsaturated compounds; the percentages by weight being based on total weight of the ethylenically unsaturated compounds.

A polyhydrazide that is a material containing two or more hydrazide groups is also present in the curable aqueous basecoat composition. The hydrazide group is very polar and usually the polyhydrazide will be in the aqueous phase. However, hydrophobic polyhydrazides may be in the dispersed phase. The polyhydrazides are reactive with the keto or aldo functionality present in the polymeric particles during dehydration of the basecoat(s) layer(s) to form a crosslinked coating. The polyhydrazide compounds suitable for this invention have two or more hydrazino groups (—NH—NH$_2$) per molecule which bind directly to the carbon atoms of the aldo or keto group. Examples of these are maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic dihydrazide and sebacic dihydrazide, and others. The polyhydrazide compound typically has between 1 to 10 carbon atoms with an equivalent ratio of hydrazide to aldo or ketone being from 0.5 to 1.5:1, permitting the coating composition to crosslink to form the highly crosslinked cured film. The polyhydrazide compound is usually present in an amount between about 0.1 weight percent to about 3.0 weight percent, based on the total weight of the curable aqueous composition.

Besides the polyhydrazide, the curable aqueous composition can contain a polycarbodiimide that is reactive with carboxylic acid functionality that is present in the polymer particle due to the carboxylic acid functionality present in the ethylenically unsaturated monomers, e.g., (meth)acrylic acid or carboxylic acid functionality present in the ethylenically unsaturated polyurethane, e.g., from the polyol containing carboxylic acid groups. As mentioned earlier, the carboxylic acid functionality is typically at least partially neutralized with a volatile amine that volatilizes during the formation of the basecoat layer exposing carboxylic acid groups that are reactive with the polycarbodiimides at ambient temperature. The equivalent ratio of polycarbodiimide to carboxylic acid is typically 0.5 to 1.5:1 and the polycarbodiimide when used is typically present in the coating composition in amounts of 1.5 to 25 percent by weight based on total weight of the curable aqueous composition. Examples of suitable polycarbodiimides are disclosed in US 2011/0070374 and are available from Nesshimbo Chemical Co. under the trademark CARBODILITE.

Besides the above components, the curable aqueous composition also contains color-imparting components such as organic and inorganic pigments, including color effect pigments such as aluminum flake and metal oxide coated micas. The pigments are typically present in the curable aqueous compositions such that the pigment to resin ratio is from 0.02 to 1.5:1 and usually the pigment is present in the composition in amounts of 2 to 70 percent by weight based on total weight of the composition.

Other optional ingredients such as dyes, wetting agents, defoamers, leveling agents, fillers, plasticizers, fungicides and solvents may also be present in the curable aqueous composition. These optional ingredients may be present in amounts up to 20 percent by weight based on total weight of the curable aqueous composition.

The aqueous curable composition can be formulated by blending the dispersion of the polymeric particles, the polyhydrazide (unless it has been previously incorporated with the other ingredients with low shear mixing). The composition can be applied to the substrate by conventional techniques such as spraying, brushing and roll coating. The coated substrate is then dried at ambient temperature, that is, 20-25° C., or may be heated to 90° C. to cure the composition. The curing time will vary depending on the temperature and relative humidity. Typically, curing times are from 5 to 120 minutes.

EXAMPLES

Illustrating the invention are the following Examples that are not to be considered as limiting the invention to their details. All parts and percentages in the Examples as well as throughout the specification are by weight unless otherwise indicated.

The following Examples show the preparation of various lattices (i.e., continuous phase comprising water and a dispersed phase comprising polymeric particles) that were used in formulating basecoat compositions.

Example A'

Polyurethane

A mixture containing a polyurethane acrylate prepolymer was prepared by adding 100 g of 2-ethylhexyl acrylate (EHA), 79.2 g of hydroxyethyl methacrylate, 81.6 g of dimethylol propionic acid, 1.5 g of 2,6-di-tert-butyl 4-methyl phenol, 0.8 g of triphenyl phosphite, 4 g triethyl amine and 0.8 g of dibutyl tin dilaurate to a four necked round bottom flask fitted with a thermocouple, mechanical stirrer, and condenser and heated to 90° C. to obtain a homogeneous solution. Then 405.5 g of polytetrahydrofuran molecular weight 1000 was added. To this mixture at 90° C., isophorone diisocyanate 225.4 g was added over 90 minutes. The isocyanate container was rinsed with 20.0 g of EHA. The reaction mixture was stirred at 90° C. until all the isocyanate groups were reacted. Then 454.0 g of EHA and 72.5 g of propylene glycol monomethyl ether was added and cooled to ambient temperature.

Example A

Control

Polyurethane Acrylic Latex

For the purpose of control, a polyurethane acrylic latex with no keto ethylenically unsaturated monomer, and 5.5% multi-ethylenically unsaturated monomer was prepared as follows:

Ten (20.0) g of Aerosol OT-75 (surfactant from Cytec Industries), 14.0 g of dimethyl ethanolamine, 369 g of prepared polyurethane/EHA mixture of Example A', 14.5 g of 1,6-hexanediol diacrylate, 97.0 g methyl methacrylate and 711 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS (biocide from Thor GmbH), 0.23 g of FOAMKILL 649 (defoamer from Crucible Chemical Co.) and 9.6 g of deionized water were charged into the flask and mixed for 15 minutes.

Example B

A polyurethane acrylic latex containing 17.8 percent by weight diacetone acrylamide (DAAM) and 17.8 percent by weight acetoacetoxyethyl methacrylate (AAEM) and 5.5 percent by weight of 1,6-hexanediol diacrylate, the percentages by weight being based on total weight of ethylenically unsaturated monomers, was prepared as follows:

Ten (10.0) g of Aerosol OT-75 (surfactant from Cytec Industries), 7.0 g of Adeka Reasoap SR-10 (emulsifier from Adeka Corp.), 9.5 g of 28% ammonium hydroxide, 369 g of prepared polyurethane/EHA mixture of Example A, 13.7 g of 1,6-hexanediol diacrylate, 44.0 g of acetoacetoxyethyl methacrylate, 44.0 g of diacetone acrylamide and 1245.4 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS (biocide from Thor GmbH), 0.23 g of FOAMKILL 649 (defoamer from Crucible Chemical Co.) and 9.6 g of deionized water were charged into the flask and mixed for 15 minutes.

Example C

A polyurethane acrylic latex containing 32.7 percent by weight of DAAM and 5.1 percent by weight of 1,6-hexanediol diacrylate, the percentages by weight being based on total weight of ethylenically unsaturated monomers, was prepared as follows:

Ten (10.0) g of Aerosol OT-75, 7.0 g of Adeka Reasoap SR-10, 9.5 g of 28% ammonium hydroxide, 369 g of prepared polyurethane/EHA mixture (above example), 13.7 g of 1,6-hexanediol diacrylate, 88.0 g of diacetone acrylamide and 1245.4 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS, 0.23 g of FOAMKILL 649 and 9.6 g of deionized water were charged into the flask and mixed for 15 minutes.

Example D

A polyurethane acrylic latex containing 32.7 percent by weight of DAAM and 5.1 percent by weight of 1,6-hexanediol diacrylate, the percentages by weight being based on total weight of ethylenically unsaturated monomers, was prepared as follows:

Seven (7.0) g of Aerosol OT-75, 10.0 g of Sipomer PAM 200 (acrylic functional monomer from Solvay-Rhodia), 10.0 g of 28% ammonium hydroxide, 369 g of prepared polyurethane/acrylate mixture (above example), 13.7 g of 1,6-hexanediol diacrylate, 22.0 g of methyl methacrylate, 88.0 g of diacetone acrylamide and 1245.4 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS, 0.23 g of FOAMKILL 649 and 9.6 g of deionized water were charged into the flask and mixed for 15 minutes.

Example E

Control

For the purpose of control, a polyurethane acrylic latex containing no keto group-containing monomer was prepared as follows:

Polyester Polyol

A mixture of 2000 g of 1,6-hexanediol, 200 g of maleic anhydride, 900 g of adipic acid and 1044 g of isophthalic acid was charged to a four necked flask with $N_2$ blanket. The mixture was then heated up to 180° C., and distillate was collected in graduated cylinder. During the process, the temperature was increased up to 225° C. step by step. The mixture was then held at 225° C. until acid value was less than 3 mg KOH/g.

Polyurethane Latex

A mixture of 1500 g of the polyester polyol, 32.3 g of 1,4-butanediol, 193.6 g of dimethylol propionic acid, 2.25 g of 2,6-di-tert-butyl 4-methyl phenol, 2.25 g of triphenyl phosphite and 58.4 g of triethyl amine was added to a four necked round bottom flask fitted with a thermocouple, mechanical stirrer, and condenser. The mixture was heated to 90° C. and mixed for an additional 30 minutes to obtain a homogeneous solution. The mixture was cooled down to 70° C., and 719 g of butyl acrylate (BA) was added to the flask. To this mixture at ~50° C., 863 g of isophorone diisocyanate was added over 20 minutes. The reaction mixture was held at 90° C. until all the isocyanate groups were reacted. Then the reaction mixture was dispersed into preheated (85° C.) mixture of 2372 g of deionized water and 36.6 g of dimethyl ethanolamine (DMEA) over 20 minutes. The mixture was mixed for an additional 30 minutes at 85° C. After that, the latex was cooled to ambient temperature.

Polyurethane Acrylic Latex 5259 g of the polyurethane latex was charged into a four necked round bottom flask and heated to 85° C. with $N_2$ blanket 3109 g of deionized water was charged into the flask, and held at 80° C. for 5 minutes. A mixture of 2069 g of BA, 214 g of hydroxypropyl methacrylate and 214 g of ethylene glycol dimethacrylate (6.7 percent by weight based on total weight of ethylenically unsaturated monomer) was added to the flask over 30 minutes. After that, the mixture was held at 80° C. for an additional 30 minutes before cooled down to 30° C. A mixture of 51 g of deionized water, 0.034 g of ferrous ammonium sulfate, 1.7 g of sodium metabisulfite and 0.8 g of DMEA were charged. Then, mixture of 1.3 g of t-butylhydroperoxide and 127 g of deionized water was charged over 20 minutes. During this charge, a peak exotherm to ~80° C. was observed. The latex was then cooled down to 30° C., and a mixture of 102 g of deionized water, 0.068 g of ferrous ammonium sulfate, 3.4 g of sodium metabisulfite and 1.6 g of DMEA were charged. After that, mixture of 2.8 g of t-butylhydroperoxide and 255 g of deionized water was charged over 10 minutes and mixed for an additional 10 minutes. 22.9 g of DMEA was added, and then mixture of 7.9 g of deionized water and 11.3 g of Proxel GXL (biocide from Lonza Inc.) was added to the flask and mixed for 10 minutes.

Example F

A polyester was prepared according to Example 9 of U.S. Pat. No. 6,762,240. The polyester was dispersed in water to a solids of 20 percent before mixing with other paint components. Dimethyl ethanolamine was used as a neutralizing amine for the acidic groups during the dispersion.

Example G

An acrylic latex was prepared as follows:
A mixture of 1268 g of deionized water and 4.4 g of Rhodapex AB/20 (surfactant from Solvay-Rhodia) was charged into a four necked round bottom flask and heated to 85° C. with $N_2$ blanket. A mixture of 6.4 g of butyl acrylate, 19 g of methyl methacrylate and 0.6 g of methacrylic acid was then added into the flask, and the temperature was raised to 85° C. It was followed by the addition of 0.21 g of ammonium persulfate dissolved in 33 g of deionized water. The reaction mixture was held for 30 minutes. After that, a pre-emulsion with 753 g of deionized water, 9.7 g of Rhodapex AB/20, 473 g of methyl methacrylate, 190 g of butyl acrylate, 41.4 g of 50% acrylamide aqueous solution, 17.5 g of ethylene glycol dimethacrylate and 17.4 g of hydroxyethyl methacrylate was added into the flask over 3 hours, simultaneously with a mixture of 0.58 g of ammonium persulfate and 151 g of deionized water. After the completion of feeds, the reaction was held for 1 hour. A pre-emulsion with 95 g of deionized water, 1.4 g of Rhodapex AB/20, 39.5 g of butyl acrylate, 24.7 g of methacrylic acid, 18.1 g of methyl methacrylate, and 26.2 g of hydroxyethyl acrylate was added into the flask over 1.5 hours simultaneously with a mixture of 0.3 g ammonium persulfate, 0.95 g of granular borax and 116 g of deionized water. After the completion of the feeds, the product was held for 2 hours, followed by cooling to 70° C., and then adding mixture of 6.3 g of dimethyl ethanolamine dissolved in 39 g of deionized water over 20 minutes. Finally, 8.9 g of acticide (MBS) dissolved in 31 g of deionized water was added into the finished latex.

Example H

A polyester resin was prepared according to Example 1 of U.S. Pat. No. 6,291,564.

The following Examples show the preparation of various basecoat compositions prepared with polyurethane acrylic lattices of the invention in which the lattices were prepared with keto group ethylenically unsaturated monomers and multi-ethylenically unsaturated monomers and polyurethane acrylic lattices that were free of one or both of these monomers. The lattices were deposited directly on cured electrodeposited coated panels.

Examples 1-3

Three (3) white basecoat compositions were prepared from the following mixture of ingredients:

|  | Parts by weight of Component | | |
| --- | --- | --- | --- |
| Components | Example 1 (control) | Example 2 | Example 3 |
| Polyurethane-acrylic latex[1] | 126.83 | — | — |
| Polyurethane-acrylic latex w/17.8% DAAM + 17.8% AAEM/ADH[2] | — | 137.99 | — |
| Polyurethane-acrylic latex w/32.7% DAAM/ADH[3] | — | — | 170.48 |
| Urethane Diol[4] | 6.92 | 6.92 | 6.92 |
| Byk 348 surfactant[5] | 0.44 | 0.44 | 0.44 |
| Byk 032 defoamer[5] | 1.73 | 1.73 | 1.73 |
| P-1000E[6] | 5.06 | 5.06 | 5.06 |
| Resimene HM2608[7] | 22.20 | 22.20 | 22.20 |
| Deionized Water | 43.70 | 21.60 | 29.30 |
| Tinuvin 1130[8] | 2.60 | 2.60 | 2.60 |
| 50% DMEA[9] | 0.61 | 0.61 | 0.61 |
| White Tint[10] | 225.58 | 225.58 | 225.58 |
| Byketol WS surfactant[5] | 11.25 | 11.25 | 11.25 |
| Surfynol 104E[11] | 11.52 | 11.52 | 11.52 |
| TOTAL | 458.44 | 447.50 | 487.68 |

[1]Example A.
[2]Example B. Adipic dihydrazide (ADH) (3.1 g/100 g latex).
[3]Example C. Adipic dihydrazide (2.4 g/100 g latex).
[4]Polyurethane dial prepared by reacting 1 mole of Jeffamine D-400 (from Huntsman Chemical Co.) with 2 moles of ethylene carbonate at 130° C. See U.S. Pat. No. 7,288,595.
[5]Additives available from Byk Chemie.
[6]Polyglycol P-1000E commercially available from Dow Chemical.
[7]Melamine curing agent commercially available from INEOS Melamines.
[8]UV absorber commercially available from Ciba-Geigy AG.
[9]Dimethyl ethanolamine 50% aqueous solution.
[10]White tint paste consisting of 61% $TiO_2$ dispersed in 9% acrylic polymer blend and having a solids content of 70%.
[11]Surfactant commercially available from Air Products and Chemicals, Inc.

Each basecoat was spray applied in an environment controlled to 70-75° F. (21-24° C.) and 50-60% relative humidity onto 4 inch by 12 inch (10 cm by 30 cm) steel panels that were coated with PPG Electrocoat (ED 6060CZ) commercially available from PPG Industries, Inc. The substrate panels were obtained from ACT Test Panels, LLC of Hillsdale, Mich. The basecoats were applied in two coats, without a flash between coats, and then flashed at ambient temperature for 5 minutes and then dehydrated for 5 minutes at 185° F. (85° C.). The film thickness was approximately 1.2 mils (30 microns). A low bake 2K clearcoat commercially available from PPG Industries, Inc. as TKAPO1000 was then applied over the basecoated panels in two coats without a flash between coats. The clearcoated panels were allowed to flash for 10 minutes at ambient conditions and baked for 30 minutes at 285° F. (140° C.). The film thickness was approximately 1.8 mils (45 microns).

nal cotton ball from a distance of approximately three inches above the panel. The panel was held right side up for approximately five seconds and then turned upside down. If the cotton ball dropped from the panel, leaving no fibers on the film, the basecoat was dust-free. If fibers remained or the cotton ball stuck to the panel, the basecoat had dust. The finger print test consisted of touching the panel with a gloved finger and assessing the tackiness or stickiness of the basecoat. If the gloved finger did not stick to the basecoat, the basecoat was tack-free. If the gloved finger stuck to the basecoat panel or was sticky, the basecoat was tacky.

| | Heated Flash Condition | | | | | |
|---|---|---|---|---|---|---|
| | 5 minutes 85° C. | | 8 minutes 50° C. | | 8 minutes Ambient | |
| Example | Cotton Ball | Finger Print | Cotton Ball | Finger Print | Cotton Ball | Finger Print |
| 1 | Dust-free | Tacky | Dust | Tacky | Dust | Tacky |
| 2 | Dust-free | Tack-Free | Dust-free | Tack-Free | Dust | Slight Tack |
| 3 | Dust-free | Tack-Free | Dust-free | Tack-Free | Dust-free | Tack-Free |

For low bake repair, the panels were wet sanded with 1000 grit sand paper and then coated with the same original basecoat in two coats, without a flash between coats, and then dehydrated for 5 minutes at 180° F. (82° C.). The film thickness was approximately 1.2 mils (30 microns). 2K BASF low bake clearcoat commercially available from BASF as PRO-GLOSS LBR was then applied over the basecoated panels in two coats without a flash between coats. The clearcoated panels were allowed to flash for 10 minutes at ambient conditions and baked for 30 minutes at 176° F. (80° C.). The film thickness was approximately 1.9 mils (49 microns).

Appearance and physical properties were measured on the coated panels. Lower BYK Wavescan values and higher DOI values are more desirable for appearance. Higher Fischer Microhardness is a more desirable property.

| Low Bake Repair (80° C.) - Vertical Panels - Appearance and Physical Properties | | | | | | |
|---|---|---|---|---|---|---|
| | | BYK Wavescan[13] | | DOI after Humidity Resistance[15] | | |
| Example | Fischer Microhardness[12] | Long Wave | Short Wave | Initial DOI[14] | 1 hour Recovery | 24 hours Recovery |
| 1 | 60 | 18.6 | 6.8 | 87 | 77 | 87 |
| 2 | 73 | 12.0 | 4.6 | 89 | 92 | 93 |
| 3 | 83 | 9.7 | 4.3 | 92 | 92 | 92 |

[12]HM2000 Fischer Microhardness instrument manufactured by Fischer.
[13]BYK Wavescan instrument manufactured by BYK Gardner USA of Columbia, Maryland.
[14]Distinctness of Image (DOI) meter manufactured by TRICOR Systems, Inc. of Elgin, Illinois.
[15]Ten day humidity resistance test similar to ASTM D1735-92 conducted in a Harshaw Equipment GS "Uni-Fog" corrosion test cabinet set at 100° F. (38° C.) and 100% relative humidity. DOI measured after 1 hour and 24 hours recovery time after completion of test.

Each basecoat was applied using a 5 mil path depth on a #14 8 path wet film applicator available from Gardco onto 4 inch by 12 inch (10 cm by 30 cm) steel panels that were coated with PPG Electrocoat (ED 6060CZ) commercially available from PPG Industries, Inc. Three sets of basecoated panels were flashed for different lengths of time and temperature. The first set was flashed for 5 minutes at 85° C. The second set was flashed for 8 minutes at 50° C. The third set was flashed for 8 minutes at ambient temperature. Cotton ball and finger print tests were run at each flash condition for each basecoat. The cotton ball test consisted of dropping a standard medici- Examples 4, 5, 6 and 7

Four (4) white basecoat compositions were prepared from the following mixture of ingredients:

| | Parts by weight of Component | | | |
|---|---|---|---|---|
| Components | Example 4 (Control) | Example 5 (DAAM) | Example 6 (Control) | Example 7 (DAAM) |
| Polyurethane-acrylic latex of Example A | 126.83 | — | 179.14 | — |
| Polyurethane-acrylic latex[16] | — | 145.63 | — | 205.68 |
| Urethane Diol | 6.92 | 6.92 | 6.92 | 6.92 |
| Byk 348 | 0.44 | 0.44 | 0.44 | 0.44 |
| Byk 032 | 1.73 | 1.73 | 1.73 | 1.73 |
| P-1000E | 5.06 | 5.06 | 5.06 | 5.06 |
| Resimene HM2608 | 22.20 | 22.20 | — | — |
| Deionized Water | 34.80 | 38.40 | 26.60 | 31.70 |
| Tinuvin 1130 | 2.60 | 2.60 | 2.60 | 2.60 |
| 50% DMEA | 0.07 | 0.07 | 0.07 | 0.07 |
| White Tint | 225.58 | 225.58 | 225.58 | 225.58 |
| Byketol WS | 11.25 | 11.25 | 11.25 | 11.25 |
| Surfynol 104E | 11.52 | 11.52 | 11.52 | 11.52 |
| TOTAL | 449.00 | 471.40 | 470.91 | 502.55 |

[16]Example D. Adipic dihydrazide (2.2 g/100 g latex).

Panels were prepared as in Examples 1-3 but using the 2K BASF low bake clearcoat as the OEM clearcoat baked for 30 minutes at 176° F. (80° C.). The film thickness was approximately 2.0 mile (51 microns).

Appearance and physical properties were measured on the coated panels. Lower BYK Wavescan values and higher DOI values are more desirable for appearance. Higher Fischer Microhardness is a more desirable property.

| Horizontal Panels (80° C. low temperature OEM bake) - Appearance and Physical Properties | | | | | | |
|---|---|---|---|---|---|---|
| | Fischer | BYK Wavescan | | | DOI after Humidity Resistance | |
| Example | Micro-hardness | Long Wave | Short Wave | Initial DOI | 1 hour Recovery | 24 hours Recovery |
| 4 (Control) | 74 | 4.3 | 12.2 | 95 | 77 | 95 |

-continued

Horizontal Panels (80° C. low temperature OEM bake) - Appearance and Physical Properties

| | Fischer | BYK Wavescan | | | DOI after Humidity Resistance | |
|---|---|---|---|---|---|---|
| Example | Micro-hardness | Long Wave | Short Wave | Initial DOI | 1 hour Recovery | 24 hours Recovery |
| 5 | 68 | 3.7 | 12.4 | 96 | 93 | 95 |
| 6 (Control) | 92 | 6.1 | 12.5 | 95 | 45 | 93 |
| 7 | 106 | 4.6 | 11.3 | 94 | 69 | 96 |

Two (2) grey basecoat compositions were prepared from the following mixture of ingredients:

| | Parts by weight of Component | |
|---|---|---|
| Components | Example 8 (Control) | Example 9 (with DAAM) |
| Urethane Acrylic Latex[17] | 125.48 | — |
| Polyurethane-acrylic latex w/ 32.7% DAAM/ADH[18] | — | 244.63 |
| Byk 348 | 0.32 | 0.32 |
| Byk 032 | 1.99 | 1.99 |
| Surfynol 104E | 4.20 | 4.20 |
| 50% DMEA | 0.37 | 0.37 |
| White Tint[19] | 102.92 | 102.92 |
| Black Tint[20] | 11.48 | 11.48 |
| Deionized Water | 39.89 | 18.74 |
| Odorless Mineral Spirits[21] | 3.00 | 3.00 |
| Urethane Diol | 10.67 | 10.67 |
| Resimene HM2608 | 14.22 | 5.56 |
| Cymel 1158[22] | 8.65 | — |
| Dowanol PnB[23] | 7.00 | 7.00 |
| 2-Ethylhexanol[24] | 3.00 | 3.00 |
| Byketol WS | 8.50 | 8.50 |
| TOTAL | 341.69 | 422.38 |

[17]Example E.
[18]Example C. Adipic dihydrazide (2.4 g/100 g latex).
[19]White tint paste consisting of 50% $TiO_2$ dispersed in 13% acrylic polymer blend and having a solids content of 61%.
[20]Black tint paste consisting of 7% carbon black dispersed in 16% acrylic polymer blend and having a solids content of 22%.
[21]Solvent available from Shell Chemical Co.
[22]Melamine formaldehyde curing agent available from Cytec Industries.
[23]Propylene glycol n-butyl ether available from Dow Chemical Co.
[24]Solvent available from Dow Chemical Co.

Each basecoat composition was spray applied in an environment controlled to 70-75° F. (21-24° C.) and 50-60% relative humidity onto 4 inch by 12 inch (10 cm by 30 cm) steel panels that were coated with PPG Electrocoat (ED 6060CZ). Each basecoat composition was applied in one coat and then flashed at ambient temperature for 5 minutes and then dehydrated for 5 minutes at 185° F. (85° C.). The film thickness was approximately 0.8 mils (20 microns).

Physical properties were measured on the coated panels. Higher Fischer Microhardness is a more desirable property. Higher MEK double rubs demonstrates better cure.

Basecoat Composition Only - Physical Properties

| Example | Fischer Microhardness | MEK Double Rubs[25] |
|---|---|---|
| 8 (control) | 9 | 8 |
| 9 | 26 | 100 |

[25]A soft durable paper towel saturated with methyl ethyl ketone solvent wrapped around a gloved finger and rubbed onto the coated panel in a forward and back motion. One double rub consists of one forward and one back motion.

Example 10 and 11

Two (2) silver basecoat compositions were prepared from the following mixture of ingredients:

| | Parts by weight of Component | |
|---|---|---|
| Components | Example 10 (Control) | Example 11 (with DAAM) |
| Polyester Latex[26] | 101.02 | 101.02 |
| Polyurethane-acrylic latex of Example A | 71.53 | — |
| Polyurethane-acrylic latex of Example C | — | 92.94 |
| Acrylic Latex[27] | 46.04 | 46.04 |
| 50% DMEA | 3.56 | 4.09 |
| Byk 348 | 0.24 | 0.24 |
| 2-Ethylhexanol | 12.57 | 12.57 |
| Odorless Mineral Spirits | 7.51 | 7.51 |
| Deionized Water | 149.82 | 167.99 |
| Dowanol PnB | 36.42 | 36.42 |
| Micronized $TiO_2$ Tint[28] | 1.34 | 1.34 |
| Black Tint[29] | 0.43 | 0.43 |
| Blue Tint[30] | 0.35 | 0.35 |
| White Tint | 0.02 | 0.02 |
| Laponite RD[31] | 1.81 | 1.81 |
| P-1000E | 2.50 | 2.50 |
| Resimene HM2608 | 34.50 | 34.50 |
| Polyester Resin[32] | 7.01 | 7.01 |
| Aluminum Paste[33] | 31.49 | 31.49 |
| Aluminum Passivator[34] | 11.25 | 11.25 |
| Acematt TS 100[35] | 1.58 | 1.58 |
| TOTAL | 520.99 | 561.10 |

[26]Example F.
[27]Example G.
[28]Micronized white tint paste consisting of 24% TIPAQUE $TiO_2$ commercially available from Ishiara Sangyo Kaisha dispersed in 17% acrylic polymer and having a solids content of 42%.
[29]Black tint paste consisting of 6% carbon black dispersed in 18% acrylic polymer and having a solids content of 24%.
[30]Blue tint paste consisting of 14% Palomar Blue commercially available from Sun Chemical dispersed in 22% acrylic polymer blend and having a solids content of 36%.
[31]Sodium lithium magnesium silicate available from Southern Clay Products.
[32]Example H.
[33]TSB 2180A aluminum paste available from Toyal America.
[34]Aluminum passivator.
[35]Silica commercially available from Evonik Degussa.

In the description below, Base1 were the basecoat compositions of Examples 8 and 9 and Base2 were the silver basecoat compositions of Examples 10 and 11. The basecoat of Example 10 was applied to the basecoat of Example 8, and the basecoat of Example 11 was applied to the basecoat of Example 9.

Each Base1 and Base2 was spray applied in an environment controlled to 70-75° F. (21-24° C.) and 50-60% relative humidity onto 4 inch by 12 inch (10 cm by 30 cm) steel panels that were coated with cured PPG Electrocoat (ED 6060CZ). The Base1 was applied in one coat and then flashed at ambient temperature for 5 minutes. The Base2 was then applied in two coats, without a flash between coats, and then flashed at ambient temperature for 5 minutes and then dehydrated for 5 minutes at 185° F. (85° C.). The film thicknesses of the Base1 and Base2 were approximately 0.8 mils (20 microns) and 0.5 mils (13 microns) respectively.

TKAPO1000 clearcoat of Examples 1-3 was then applied over the Base1/Base2 panels in two coats without a flash between coats. The clearcoated panels were allowed to flash for 10 minutes at ambient conditions and baked for 30 minutes at 185° F. (85° C.). The film thickness was approximately 1.8 mils (45 microns).

For low bake repair, the panels were wet sanded with 1000 grit sand paper and then coated with the same original Base2 in two coats, without a flash between coats, and then dehydrated for 5 minutes at 180° F. (82° C.). The film thickness was approximately 0.5 mils (13 microns). The 2K BASF low bake clearcoat of Examples 1-3 was then applied over the basecoated panels in two coats without a flash between coats. The clearcoated panels were allowed to flash for 10 minutes at ambient conditions and baked for 30 minutes at 176° F. (80° C.). The film thickness was approximately 1.8 mils (45 microns).

Appearance was measured on the coated panels before and after Water Soak Testing. Higher DOI values are more desirable for appearance.

| Base1/Base 2 - Appearance and Water Soak Testing | | | | |
|---|---|---|---|---|
| Example | Initial DOI (OEM) | 2 Day Water Soak DOI[36] (OEM) | Initial DOI (Low Bake Repair) | 2 Day Water Soak DOI (Low Bake Repair) |
| Ex. 8/Ex. 10 (control) | 88 | 9 | 91 | 21 |
| Ex. 9/Ex. 11 | 87 | 49 | 93 | 50 |

[36]A 48 hour deionized water soak test where the entire panel is submerged at a water temperature of 63° C.

Examples 12-17

Six (6) basecoat compositions were prepared from the following mixture of ingredients:

| | Parts by weight of Component | | | | | |
|---|---|---|---|---|---|---|
| Components | Ex. 12 (Control) | Ex. 13 (Carbo-diimide) | Ex. 14 (Carbo-diimide) | Ex. 15 (Carbo-diimide) | Ex. 16 (DAAM) | Ex. 17 (Carbo-diimide & DAAM) |
| Polyurethane-acrylic latex of Example A | 126.83 | 179.14 | 147.72 | 113.69 | — | — |
| Carbodilite V-02-L2[37] | — | 15.00 | 30.00 | 62.50 | — | 15.00 |
| Polyurethane-acrylic latex w/32.7% DAAM/ADH[38] | — | — | — | — | 205.06 | 205.06 |
| Urethane Diol | 6.92 | 6.92 | 6.92 | 6.92 | 6.92 | 6.92 |
| Byk 348 | 0.44 | 0.44 | 0.44 | 0.44 | 0.44 | 0.44 |
| Byk 032 | 1.73 | 1.73 | 1.73 | 1.73 | 1.73 | 1.73 |
| P-1000E | 5.06 | 5.06 | 5.06 | 5.06 | 5.06 | 5.06 |
| Resimene HM2608 | 22.20 | — | — | — | — | — |
| Deionized Water | 34.90 | 30.26 | 31.20 | 36.30 | 26.18 | 42.13 |
| Tinuvin 1130 | 2.60 | 2.60 | 2.60 | 2.60 | 2.60 | 2.60 |
| 50% DMEA | 0.01 | 0.01 | 0.01 | 0.01 | 0.01 | 0.01 |
| White Tint | 225.58 | 225.58 | 225.58 | 225.58 | 225.58 | 225.58 |
| Byketol WS | 11.25 | 11.25 | 11.25 | 11.25 | 11.25 | 11.25 |
| Surfynol 104E | 11.52 | 11.52 | 11.52 | 11.52 | 11.52 | 11.52 |
| TOTAL | 449.04 | 489.51 | 474.03 | 477.60 | 496.35 | 527.30 |

[37]Polycarbodiimide crosslinker commercially available from Nisshinbo.
[38]Example D. Adipic dihydrazide (2.2 g/100 g latex).

Each basecoat was spray applied in an environment controlled to 70-75° F. (21-24° C.) and 50-60% relative humidity onto 4 inch by 12 inch (10 cm by 30 cm) steel panels that were coated with cured PPG Electrocoat (ED 6060CZ). The basecoats were applied in two coats, without a flash between coats, and then flashed at ambient temperature for 5 minutes and then baked for 30 minutes at either 80° C. or 140° C. The film thickness was approximately 0.9-1.2 mils (23-31 microns).

Physical properties were measured on the coated panels. Higher Fischer Microhardness is a more desirable property. Higher MEK double rubs demonstrates better cure. Good adhesion is a desirable property.

| Basecoat Composition - Physical Properties | | | | |
|---|---|---|---|---|
| Example | Bake Temperature | Fischer Microhardness | MEK Double Rubs | Adhesion[39] |
| 12 | 80° C. | 14 | 5 | 0 |
| 13 | | 13 | 90 | 0 |
| 14 | | 18 | 100 | 5 |
| 15 | | 24 | 100 | 5 |
| 16 | | 18 | 17 | 3 |
| 17 | | 30 | 100 | 4 |
| 12 | 140° C. | 45 | 100 | 5− |
| 13 | | 20 | 100 | 5− |
| 14 | | 27 | 100 | 5 |
| 15 | | 39 | 100 | 5 |
| 16 | | 30 | 25 | 5 |
| 17 | | 44 | 100 | 5− |

[39]ASTM D3359 Classification of Adhesion Test Results method, 5 = best.

What is claimed is:

1. A method of applying a multilayer coating to a substrate comprising:
(a) applying, without application of an intermediate primer surfacer coating, a color-imparting, pigment-containing basecoat composition directly to a cured electrodeposited primer coating that is adhered to the substrate to form a curable color-imparting basecoat layer, and
(b) applying a curable unpigmented coating composition to the basecoat layer to form a clear or transparent coating layer over the basecoat layer, wherein the basecoat layer is formed by depositing a polyhydrazide-containing curable aqueous composition comprising:
(i) a continuous phase comprising water, and
(ii) a dispersed phase comprising:
(A) polymeric particles prepared from the polymerization of a mixture of ethylenically unsaturated monomer compounds, including ethylenically unsaturated monomers comprising:
(1) a multi-ethylenically unsaturated monomer and
(2) an aldo or keto group-containing ethylenically unsaturated monomer; wherein the equivalent ratio of hydrazide groups in the polyhydrazide to aldo or keto groups is from 0.5 to 1.5:1.

2. The method of claim 1 wherein the basecoat layer is a composite coating in which an aqueous curable color-imparting coating composition containing one or more coloring pigments, not including a color effect pigment, is deposited directly on the cured electrodeposited layer to form a first curable basecoat layer and a curable color-imparting coating composition containing one or more coloring pigments, including a color effect pigment, is deposited directly on the first curable basecoat layer to form a second curable basecoat layer.

3. The method of claim 2 in which the first basecoat layer is dehydrated before application of the second basecoat layer at a temperature within the range of ambient temperature to 90° C. to cure the first basecoat layer by reaction of the polyhydrazide with the keto or aldo groups.

4. The method of claim 3 wherein the second basecoat layer is dehydrated after application thereof at a temperature within the range of ambient temperature to 90° C. to cure the second basecoat layer by reaction of the polyhydrazide with the keto or aldo groups.

5. The method of claim 2 wherein both the first and second basecoat layers are simultaneously dehydrated at a temperature range of ambient to 90° C. to cure the first and second basecoat layers by reaction of the polyhydrazide with the keto or aldo groups.

6. The method of claim 1 in which the mixture of ethylenically unsaturated compounds includes an ethylenically unsaturated polyurethane.

7. The method of claim 6 in which the ethylenically unsaturated polyurethane is prepared from reacting an organic polyisocyanate with a polyol containing carboxylic acid functionality and a hydroxyalkyl(meth)acrylate such that the ethylenically unsaturated polyurethane is free of NCO groups.

8. The method of claim 6 in which the ethylenically unsaturated polyurethane comprises from 30 to 60 percent by weight of the mixture of ethylenically unsaturated compounds and the ethylenically unsaturated monomers comprise from 40 to 70 percent by weight of the mixture of ethylenically unsaturated compounds; the percentages by weight being based on total weight of the mixture of ethylenically unsaturated compounds.

9. The method of claim 1 wherein upon curing of the basecoat layer, it demonstrates a $T_g$ less than 25° C.

10. The method of claim 1 in which the multi-ethylenically unsaturated monomer is present in amounts of 2 to 30 percent by weight based on total weight of the ethylenically unsaturated monomers.

11. The method of claim 1 in which the keto group-containing ethylenically unsaturated monomer is present in amounts of at least 30 percent by weight based on total weight of ethylenically unsaturated monomers.

12. The method of claim 1 in which the ethylenically unsaturated monomers comprise from 4 to 30 percent by weight of an alkyl ester of (meth)acrylic acid having at least 6 carbon atoms in the alkyl group; the percentage by weight being based on total weight of the ethylenically unsaturated monomers.

13. The method of claim 1 in which the polyhydrazide comprises at least one of maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic dihydrazide and sebacic dihydrazide.

14. The method of claim 1 in which the mixture of ethylenically unsaturated compounds contains at least one compound containing carboxylic acid functionality that is at least partially neutralized with an amine.

15. The method of claim 14 in which the amine is a volatile amine.

16. The method of claim 15 wherein the dispersed phase additionally contains (B) a polycarbodiimide.

17. The method of claim 16 in which the equivalent ratio of carbodiimide to carboxylic acid is from 0.5 to 1.5:1.

18. The method of claim 1 in which the curable unpigmented coating composition comprises an active hydrogen-containing polymer and a polyisocyanate curing agent.

19. The method of claim 1 in which the basecoat is cured by reaction of the polyhydrazide with the keto or aldo groups at ambient to 90° C. before application of the curable unpigmented coating composition to the basecoat layer.

* * * * *